United States Patent [19]

Cheng et al.

[11] Patent Number: 5,204,958
[45] Date of Patent: Apr. 20, 1993

[54] SYSTEM AND METHOD FOR EFFICIENTLY INDEXING AND STORING A LARGE DATABASE WITH HIGH DATA INSERTION FREQUENCY

[75] Inventors: Edward C. Cheng, South San Francisco; Dieter Gawlick, Palo Alto, both of Calif.; Patrick E. O'Neil, Lexington, Mass.

[73] Assignee: Digital Equipment Corporation, Maynard, Mass.

[21] Appl. No.: 722,007

[22] Filed: Jun. 27, 1991

[51] Int. Cl.$^5$ .................................... G06F 15/413
[52] U.S. Cl. ........................ 395/600; 364/DIG. 1; 364/282.1; 364/282.3; 364/283.2
[58] Field of Search ................... 364/200 MS File; 395/600

[56] References Cited

U.S. PATENT DOCUMENTS

| | | | |
|---|---|---|---|
| 4,468,728 | 8/1984 | Wang | 364/200 |
| 4,611,272 | 9/1986 | Lomet | 364/200 |
| 4,677,550 | 6/1987 | Ferguson | 364/200 |
| 4,945,475 | 7/1990 | Bruffey et al. | 395/600 |
| 4,967,139 | 10/1990 | Hong et al. | 395/600 |
| 5,089,952 | 2/1992 | Bozman | 395/600 |

OTHER PUBLICATIONS

Douglas Comer, "The Ubiquitous B-Tree", Computing Surveys, vol. 11, No. 2, Jun. 1979, pp. 121-136.

*Primary Examiner*—David L. Clark
*Assistant Examiner*—Wayne Amsbury
*Attorney, Agent, or Firm*—Flehr, Hohbach, Test, Albritton & Herbert

[57] ABSTRACT

A database index file is maintained by a computer system having primary random access memory and secondary memory. A record for each item added to the database is stored in a sequential file in secondary memory (disk storage) and an indexed pointer to the new record is stored in a small B-tree stored in primary random access memory. The full index file for the database is a second, large B-tree stored in secondary memory. Leaf-nodes of the full index file are stored in indexed order. Periodically, a portion of the memory resident small B-tree is merged with a corresponding portion of the large B-tree by selecting a range of index values and retrieving from secondary memory all indexed pointers in the selected range of index values. The indexed pointers in the first B-tree in the selected range of index values are merged into the retrieved records, the resulting merged set of indexed pointers are stored in secondary memory in indexed order in a contiguous area of secondary memory. As a result, the indexed pointers for newly added database records are written to secondary memory in batches, thereby accessing secondary memory very efficiently.

22 Claims, 5 Drawing Sheets

FIGURE 1

PRIOR ART

SYSTEM AND METHOD FOR EFFICIENTLY INDEXING AND STORING A LARGE DATABASE WITH HIGH DATA INSERTION FREQUENCY

The present invention relates generally to data base management systems for storing large databases, and particularly to methods and systems for making efficient use of primary memory and secondary memory when storing a large database with a high data insertion frequency.

BACKGROUND OF THE INVENTION

Consider a large multi-user computer system which maintains a cumulative journal of all transactions executed by the computer system (sometimes called the log file). Typically, each log entry will identify the transaction, indicate whether the transaction was completed or aborted, and include other relevant data. Over time, a very large number of such log entries will accumulate, and these entries are typically stored in sequential disk files. In a complex transaction handling computer system with long-lived transactions and a large, continuing load of transactions, log records are created at a very high rate, requiring insertion of log records into a file at high frequency.

In at least some situations, later access to log records by one or more indexed values is desirable. For instance, some system users may access such historical records with sufficient frequency that the files need to be stored in a specialized database management system (DBMS) using indexed references in order to enable efficient access to this data.

In many transaction handling computer systems, logging has been focused on assuring recovery from system failures, and thus has required the system to be able to refer back to a relatively short-term history of events. However, as system loads continue to grow and as transactional systems take on responsibility for more complex activities, the requirement for activity recording (event logging) shifts from simple recovery logging to long-term activity flow management support, system monitoring, security, and so on. With this shift, the duration and number of events which make up a single long-lived transaction will increase to the point where there is a frequent need for human agents to review the steps taken up to a given time. At the same time, the total number of active events known to a system will increase to the point were memory-resident data structures now used to keep track of active events are no longer feasible.

MULTI-USER BANKING SYSTEM EXAMPLE

Consider as an example, a multi-user banking system running one hundred transactions per second. Each transaction updates a column value in a randomly chosen row from one of several different tables. Using a system with three primary tables, two of which are small enough to be maintained in primary memory and one of which is maintained in secondary memory, each transaction will require, on average, two I/O operations, for a total of 200 disk I/O operations per second. If each disk arm of a disk storage device can handle no more than 25 I/O operations per second, then eight disk arms would be required to handle this level of transactional activity.

One can easily envision a use for indexed retrieval of log records by any of a number of keys: Account Identifier concatenated with a Timestamp, to answer questions by account holders about past transactions; Teller Identifier concatenated with a Timestamp, to make it easier to resolve cash drawer imbalances, etc. The duration of interest for such indexes can be quite long.

Now consider the added resources that would be needed to keep an Account-ID-Timestamp index on log records over a period of a month, using a standard B-tree indexed file. For those readers not familiar with B-tree indexes, note that these types of indexes are well known in the prior art, and will be explained in some detail below. For now, the only significance of the use of standard B-tree indexes is that the position of the index of the log record for each successive record is random—meaning that it can be at any position in the file. One hundred new log index entries are generated per second for the Account-ID-Timestamp index, eight hours per day, twenty working days per month. Thus there are about 57,600,000 new entries generated per month. In addition, each index entry will require at least ten bytes, resulting in an index table occupying about half a gigabyte of storage space. Clearly, most of the index table will not be memory resident. Since the position of each new inserted log record is random, it will typically require an average of one page read and one page write in order to insert the log record for each transaction. Thus, each index of this kind adds about 200 disk I/O operations per second, or an additional eight disk arms.

Delete operations required to keep the log index to only twenty days in length can probably be performed during non-peak usage hours. Otherwise, such delete operations will add about another 200 disk I/O operations per second to the system's load.

If two or three such transaction log indexes are maintained, the number of disk storage devices required to handle the flow of transactions will exceed the number of disk storage devices required to maintain the bank's basic financial records.

The present invention overcomes the above described disk I/O bottleneck associated with high frequency data insertion. It enables a computer system to perform high frequency inserts into the indexes of large databases with much less disk arm use, and therefore at much lower cost. In particular, the present invention defers index changes, and handles such updates to the stored log indexes in batches in a predefined order that matches the order in which indexes are stored on disk. As a result, the load imposed on disk devices is greatly reduced.

Also, the activity of maintaining such indexes can be performed on a separate processor and on a separate disk from the primary database and DBMS program. As a result, the process of maintaining indexes for a high insertion rate database does not hurt the performance of the main DBMS activity, which is storing newly inserted records reliably and quickly.

SUMMARY OF THE INVENTION

In summary, the present invention is a database indexing methodology which allows low cost indexing of databases with very high insertion rates. A database index file is maintained by a computer system having primary random access memory and secondary memory. A record for each item added to the database is stored in a sequential file in secondary memory (disk storage) and an indexed pointer to the new record is stored in a small B-tree stored in primary random access memory. The full index file for the database is a second, large B-tree stored in secondary memory. Leaf-nodes of the full index file are stored in packed, indexed order.

Periodically, a portion of the memory resident small B-tree is merged with a corresponding portion of the large B-tree by selecting a range of index values and retrieving from secondary memory all indexed pointers in the selected range of index values. The indexed pointers in the first B-tree in the selected range of index values are merged into the retrieved records, the resulting merged set of indexed pointers are stored in secondary memory in indexed order in a contiguous area of secondary memory at the tail of the large B-tree. As a result, the indexed pointers for newly added database records are written to secondary memory in batches, thereby accessing secondary memory very efficiently.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
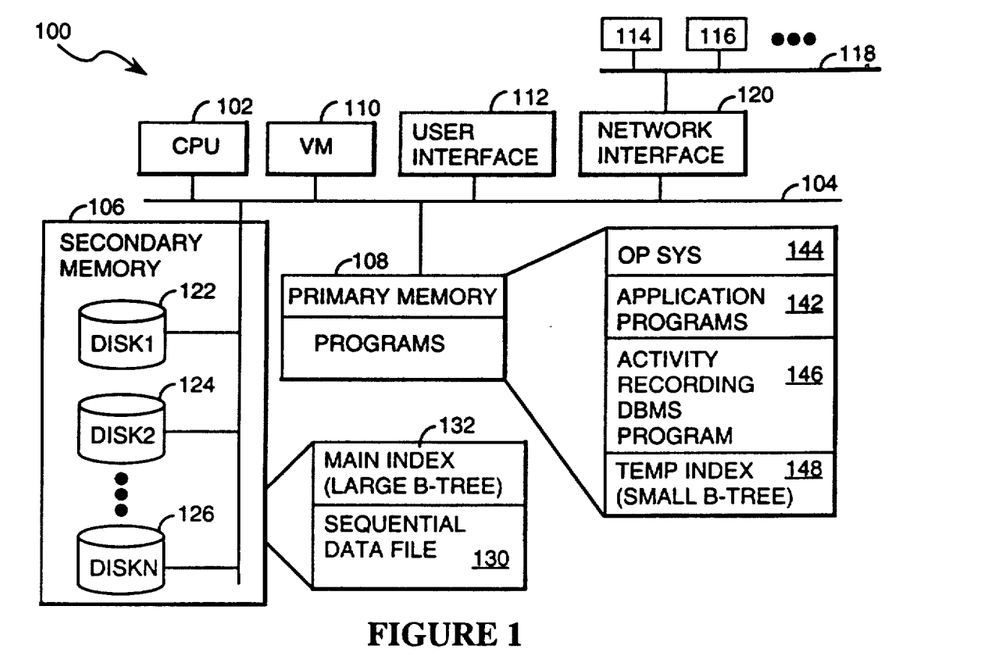
FIG. 1 is a block diagram of a computer system in accordance with the present invention.

Referring to FIG. 1, there is shown a computer system 100 having a central processing unit 102 which is interconnected by system bus 104 to secondary memory 106 (e.g., magnetic disk storage devices), primary memory 108 (i.e., high speed, random access memory), virtual memory manager 110, and a user interface 112. The computer system 100 is typically interconnected with numerous other computers 114, 116 by a local or wide area network bus 118 that is connected to this computer system 100 by a network interface 120.

While the present invention can be used with a single computer 100, more typically the present invention will be used in distributed computational systems, such as those used by banks, airlines and other widely distributed businesses. The computers at a large number of locations will participate in transactions, and the application programs performing those transactions will generate many data records representing the content, progress and status of those transactions. In this context, system 100 can be seen as the node in the distributed computational system whose job is to receive, index and store all event messages.

The secondary memory 106 will typically contain a "disk farm", which is a collection of disk storage devices 122-126 that are used to store data and programs. Multiple disk storage devices are often used because of the limited data handling capabilities of any single one device, and because of the large amounts of data to be stored. In any case, in the present invention, secondary memory 106 is used to store a sequential data file 130, which is the main database file where data records are stored. Secondary memory 106 is also used to store the "main index" file 132, which is a keyed index into the data file 130. This index is used to access records in the data file 130, much as in any ordinary database management system. For instance, the data records may be indexed using a key that is the concatenation of an agent identifier (which identifies the user or computational agent which generated the message) and a timestamp (which identifies the time at which the message was generated). If multiple indexes are needed, then a separate index file 132 will be generated for each index.

Stored in primary memory 108 are currently executing application programs 142, as well as operating system software 144, an activity recording database management program 146, and a temporary index 148, the purpose of which will be described below. Other data structures used by the system, such as buffers for disk I/O, are also located in primary memory. The database management program 146 receives all the activity records (sometimes called log messages) generated by applications throughout the distributed transaction processing system and stores them in the sequential data file 130. It also generates and stores one or more index pointers for each data record entry, depending on the number of indexes which have been set up by the computer system manager.

B-TREE DATA STRUCTURE

Database management systems (DBMS's) often use a data structure called a "B-tree" to quickly access the records stored in a database. While such data structures are well known to those skilled in the art, a short summary of the B-tree data structure is provided next for readers not familiar with the data structures used for DBMS indexes.

Figure 2:
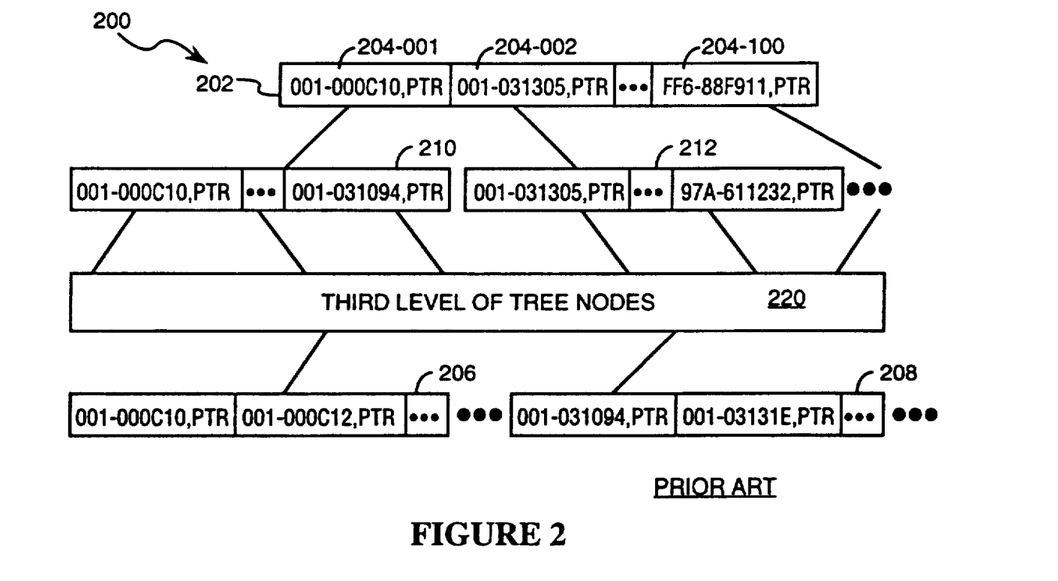
FIG. 2 is a block diagram of a B-tree data structure.

The term "B-tree" literally stands for "balanced tree". A B-tree index is not a classical binary tree, but rather is an N-ary tree in which each non-leaf node has N children. Referring to FIG. 2, we show an ordinary B-tree data structure 200, similar to those found in almost any DBMS. At the top of the tree is a root node 202. At the bottom of the tree are leaf nodes 206, 208. In between the root 202 and the leaf nodes are intermediate nodes 210-220. The root nodes and the intermediate nodes are collectively called "non-leaf nodes".

In this example, the root node 202 contains one hundred key values 204-001 through 204-100. A key value is the value being used to index a set of records, and is typically a combination of the first couple of fields in the record. For example, if the records in a database look like:

| AGENT | TIME | ACTION1 | ACTION2 | PARAM1 |
| --- | --- | --- | --- | --- |
| 001 | 000C10 | "DUMP" | "ABORT" | 5444 |
| FF6 | 88F11D | "YES" | "COMMIT" | 1011 |
| ... | | | | | the database might be keyed by concatenating the three hexadecimal-digit agent field with the time field, resulting in key values of 001-000C10 for the first record shown above, and FF6-88F11D for the second record shown above. Note that the hyphen "-" shown in these key values is not included in the stored value, but is shown here solely for readability.

Every index value 204 in the non-leaf nodes of the tree is accompanied by a pointer value PTR, which points to another node (e.g., node 210) in the next lower level of the tree. The key values stored in each non-leaf node indicates "intervals" of key values which divide the portion of the tree under that node into approximately equal pieces.

The purpose of the B-tree 200 is to maintain a index of records in sorted order. Let's assume that the our database contains 9,000,000 records, each having a unique key value. The root node 202 will divide these records into, say, one hundred approximately equal size groups. In order words, if the key values in the root are labelled key 1 through key 100, the number of records having key values between key 1 and key 2 will be approximately the same as the number of records have key values between key 2 and key 3, and so on.

The key values listed in the root node are listed in increasing order (although decreasing order could be used). All records having a key value between the values of key N and key N+1 in the root are found by referencing a node in the second level of tree corresponding to key N. Thus a record with a key value of 001-022111 (which is between the first two key values in the root node 202) is found by accessing the second level node 210, which corresponds to the first key in the root, and then using entries in that second level node 210 to find a pointer in a leaf node to the specified record.

The non-leaf nodes at the second and third levels of the tree 200 are identical in structure to the root node, each dividing their portion of the database into 100 approximately equal-sized subsets. Each node has a predefined minimum and maximum number of entries. For example, nodes could be allowed to each have as few as seven and as many as one hundred entries. Thus, in this example, there will be as many as 100 nodes at the second level of the tree, and as many as 10,000 nodes at the third level 200 of the tree. The nodes 220 at the third level of the tree point to as many as one million leaf nodes 206-208.

The leaf nodes 206 in this example each contains up to 100 data pairs, representing up to 100 data records in the file 130. Each data pair comprises a key value and a pointer to a record in the sequential data file 130. The pointer value is equivalent to a disk address value, but is typically an intermediate pointer that indicates the position of the record.

For the purposes of this document, an "indexed pointer" is defined to mean a pair of values, comprising an index value paired with a pointer value, or any equivalent data structure or unit of information.

Figure 4A:
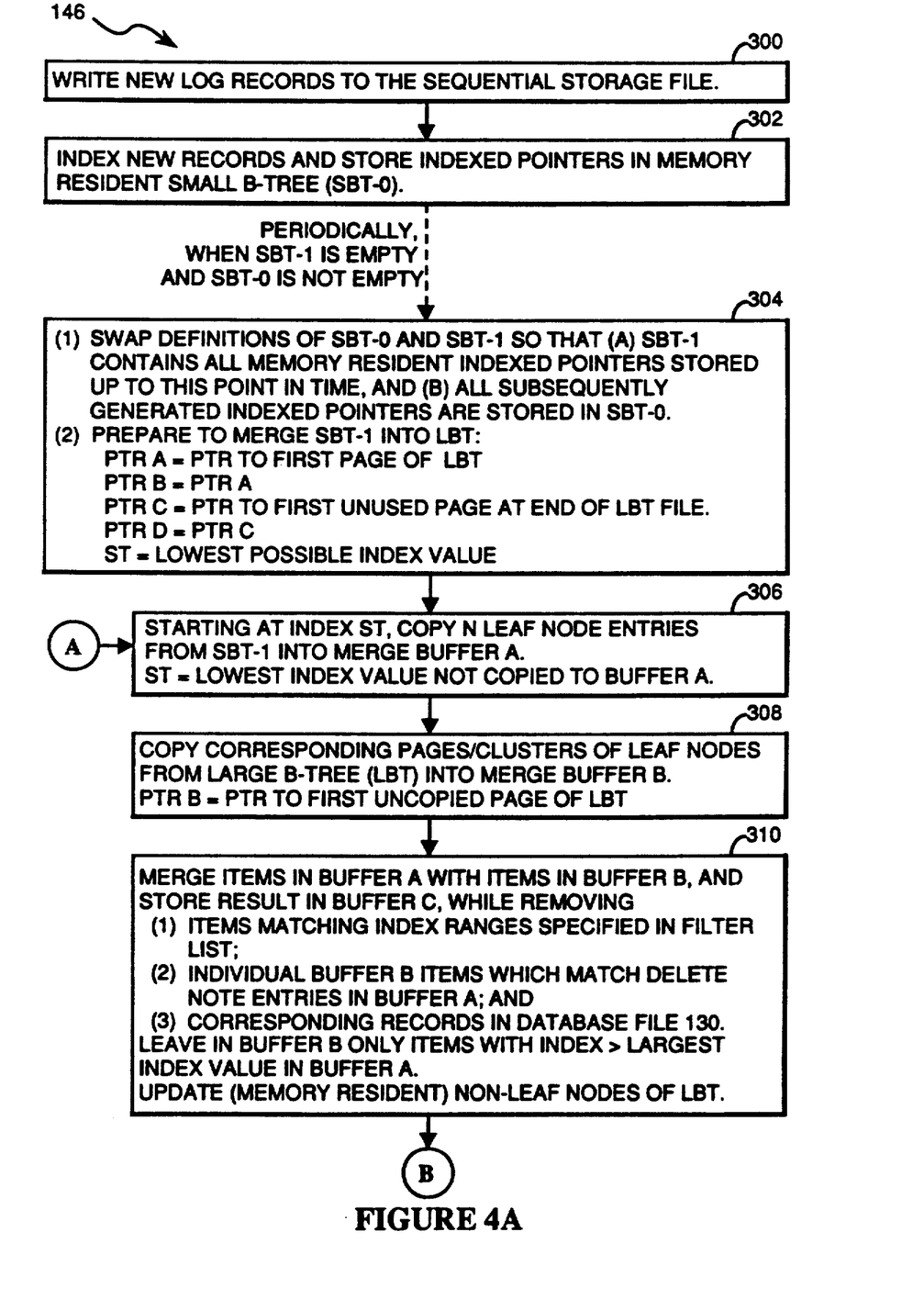
FIGS. 4A and 4B are a flow chart of the process used in the preferred embodiment for storing indexed pointers.

Using the four level tree shown in FIG. 4, with one hundred data values stored in each tree node, one can store an index for up to 100 million records. If more than 100 million records need to be indexed, either the size of the nodes can be increased (e.g., doubling the size of the nodes would increase the capacity of a four level tree to 1.6 billion records), or the tree 200 can be expanded to a five level tree, which could handle up to 10 billion records.

It should be noted that the actual number of key-values stored in the nodes of a real system will depend on factors such as the system's memory page size (each node will typically occupy one page of disk memory), the number of bytes occupied by each key value, and the predicted maximum size of the database that is being indexed.

The procedures for adding and deleting items from the tree 200 of FIG. 2 are well known to those skilled in the art. Basically, the proper place for inserting a new entry is determined by tracing down the tree, following the nodes with key value ranges corresponding to the new entry, until the proper leaf node is found. If the leaf node has room for the new entry, it is simply added to that leaf node. If the leaf node is full, entries are either shifted among the existing leaf nodes to make room for the new entry or a new leaf node may be created. When necessary, the key value intervals stored in the corresponding parent nodes are adjusted to keep track to the contents of the tree nodes.

Deleting entries is straightforward. The entry is deleted from its leaf node. Deletion may cause the number of nodes in the tree to shrink, since there is a minimum allowed number of entries for each node.

As stated above, the index values and the node size used in FIG. 2 were designed only for purposes of explaining the B-tree data structure. In a real application, such as for a bank with thousands of tellers and automatic teller machines, the index values would typically be at least ten bytes long (e.g., four bytes for an agent ID and six bytes for a timestamp value), and the pointers in both the leaf and non-leaf nodes would each be perhaps four bytes long (to provide a thirty-two bit address). Thus each leaf with 100 entries would occupy about 1400 bytes of memory storage.

SMALL AND LARGE B-TREES

As mentioned above in the Background of the Invention, the problem with the B-tree data structure 200 shown in FIG. 2 is that in a system with a very high level of data insertion, maintaining a large index file can require an excessive number of disk storage devices due to the large number of read and write operations to locations randomly distributed throughout the B-tree 200. Furthermore, it is impractical to store the entire index in primary random access memory 108. For instance, in a system which stores 60 million records and which uses indexed pointers requiring fourteen bytes of storage, the leaf nodes of the index file will require 840 Megabytes of storage—which is costly to store in primary memory.

The non-leaf nodes of the index file B-tree will typically use only about one percent as much storage space as the leaf nodes. Therefore keeping a copy of, say, ten percent or even twenty-five percent of the non-leaf pointers in primary memory (requiring approximately 2.1 Megabytes of storage) is quite practical.

Figure 3:
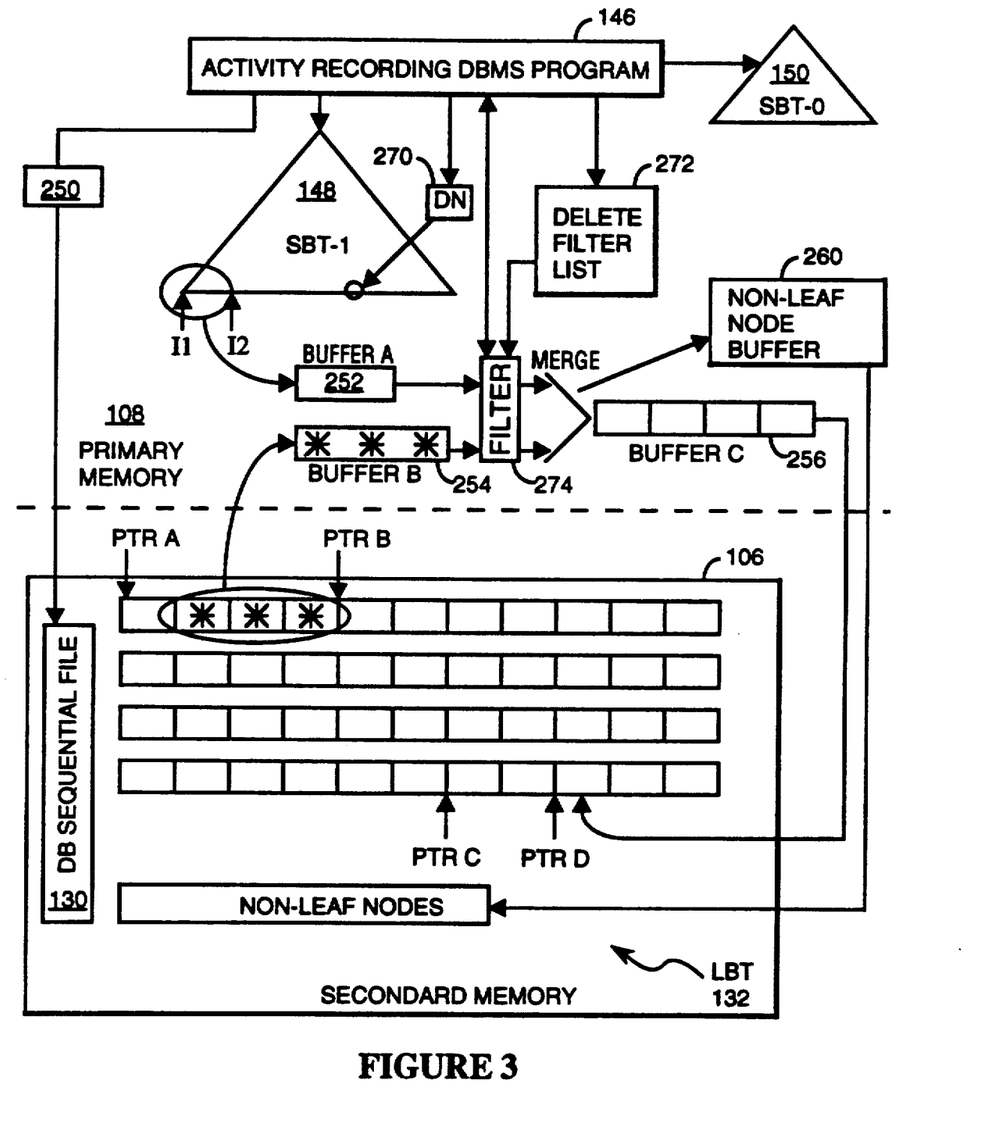
FIG. 3 is a conceptual block diagram of the process used in the preferred embodiment for storing indexed pointers to a large database.
Figure 4B:
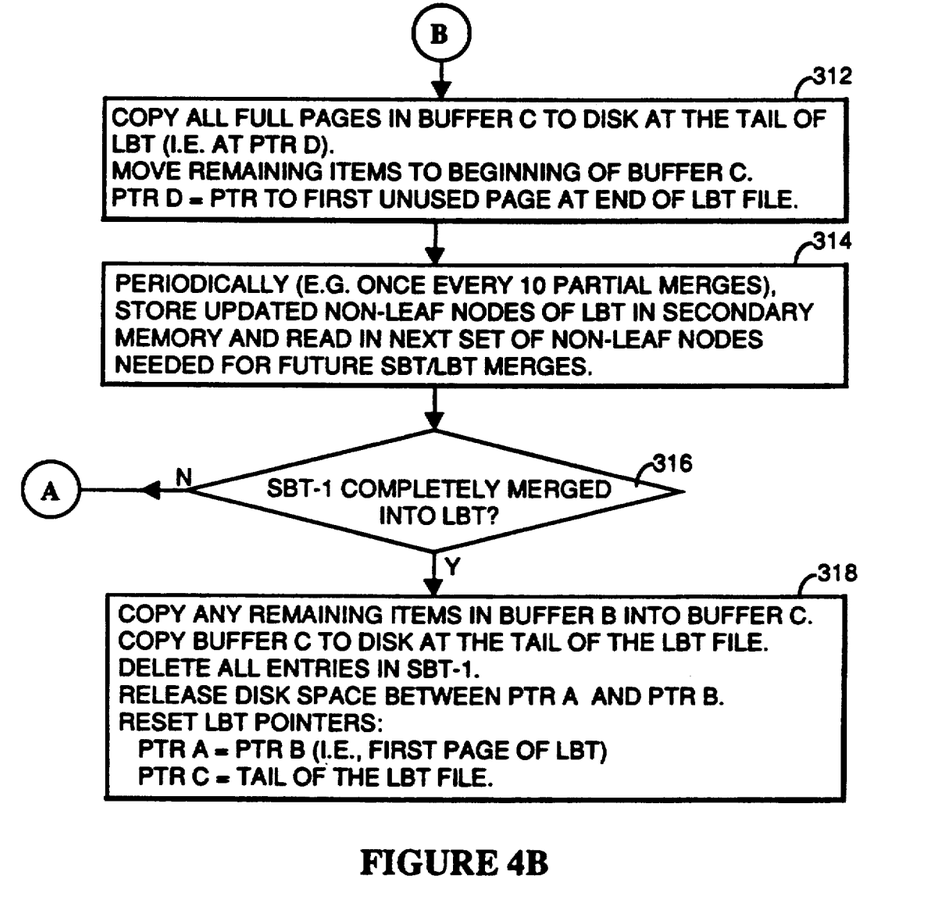

Referring to FIGS. 3 and 4, the database management program 146 works as follows. Whenever a new data record is received, it is stored in secondary memory in the sequential data file 130 (step 300). This is called a "sequential" data file because new records are always written to the end of the file in a temporal order, regardless of their index value. In some systems, a small number of such records may be temporarily stored in a buffer 250 until a full page, or several full pages, of such records is ready to be stored, or until a transaction "commits", requiring that all records related thereto be securely stored.

After a number of records are stored in secondary memory file 130, a block of these records are read, and corresponding indexed pointer are created and temporarily stored in primary memory in the index file 148 (step 302), herein called the small B-tree (SBT) 148. For reasons that will be explained in more detail below, the preferred embodiment uses two small B-trees, SBT-1 148 and SBT-0 150. For the moment, we will consider the second small B-tree 150 to be "the" small B-tree.

The SBT 150 is a B-tree, much like the one shown in FIG. 2. Since the indexed pointers for new records are stored in primary memory, the generation and storage of such indexed pointers is very fast, and incurs no costs with respect to usage of secondary memory.

All the indexed pointers for records in the database file 130, except for those temporarily stored in the SBT 150, are stored in the main index file 132, herein called the large B-tree (LBT). The most important feature of the LBT 132 is that the indexed pointers are stored in secondary memory in indexed order, and packed so as to use disk space efficiently. The phrase "stored . . . in indexed order" is herein defined to mean that when secondary memory is read in address sequential order, the index values of the indexed pointers in the LBT 132 will increase or decrease monotonically, except for "wrap around" (which will be explained below).

The purpose of the SBT 150 is to temporarily store indexed pointers, and to store a sufficiently large number of these pointers to enable efficient storage of these indexed pointers in secondary memory using a rolling merge type of procedure. For the purpose of explanation, we will assume that the SBT 150 typically holds about 20,000 indexed pointers at any one time, representing about 200 seconds of record insertions (assuming that records are inserted on average at 100 records per second). Using a three level tree with 100 items stored in each node, the SBT 150 could store up to one million indexed pointers. Since only about 20,000 will be stored, the second level non-leaf nodes will be very sparsely populated. On the other hand, if there is a temporary surge of record insertions, or if the disks in secondary storage were unavailable for a period of ten minutes (e.g., for making a tape backup of secondary storage), the three-level SBT can easily absorb a much larger number of indexed pointers so long as sufficient primary memory is available.

The reason that there are two SBT's in FIG. 3 is that newly created indexed pointers are stored in one SBT 150, while the other SBT 148 is being merged into the LBT 132. Periodically, after SBT-1 148 has been completely merged into the LBT 132 and its contents deleted, the definitions of SBT-0 and SBT-1 are swapped (step 304). After this swap, all subsequently created indexed pointers are stored in SBT-0 (which is empty right after the swap), and the DBMS program 146 prepares to merge the contents of SBT-1 into the LBT 132.

Prior to merging SBT-1 into the LBT, disk pointers are set up to the beginning and tail of the LBT file. Two of the pointers, PTR A and PTR C, point to the beginning and end the LBT prior to performing the merge. These two pointers are retained throughout the merge operation so that if the computer system crashes in the middle of the merge process, it will be possible to back up to this well defined point in the index storage process, and then regenerate all subsequently generated indexed pointers using records stored in the sequential data file 130.

The process of merging the SBT 148 into the LBT is done in stages, with steps 306 to 316 being repeated many times. For example, every two seconds the system might merge one percent of the indexed pointers in the SBT 148 into the LBT 132. To do this, the DBMS program 146 selects a range of index values I1 to I2, copies all the indexed pointers in the SBT within that range into a buffer 252 (which is just an array in primary memory) called Buffer A. A pointer ST keeps track of the lowest index value not yet copied into Buffer A (step 306). All the indexed pointers in the SBT 148 are retained at this time so that a search for any of these items can be performed prior to completing the merger of the SBT 148 into the LBT 132.

Next, at step 308, all the indexed pointers in secondary memory in the LBT 132 for this same range of index values are copied into another buffer 254, herein called Buffer B. For efficiency, indexed pointers are copied into Buffer B in units of pages, starting with the page pointed to by pointer PTR B. After this copying step, PTR B is advanced to point to the first uncopied page of the LBT 132.

At step 310, the contents of Buffer A and Buffer B are merged, and the merged pointers are stored in indexed order in Buffer C 256. Note that any pointers in Buffer B with an index value greater than I2 are left in Buffer B for use during the next merge operation (i.e., during the next pass through steps 306–316). For the moment, we will ignore the fact that step 310 is also the step in which pointers are deleted from the index file.

A copy of some of the non-leaf nodes of the LBT file 132 is maintained in primary memory buffer 260. The portion of the non-leaf nodes stored in buffer 260 is a matter of design choice, but will typically be large enough to allow copying of the non-leaf nodes to secondary memory, and reading in a new subset of the non-leaf nodes, every N merge cycles (e.g., once every ten merge cycles). Thus, if one percent of the SBT 148 is merged during each loop through steps 306–316, perhaps fifteen to twenty percent of the LBT's non-leaf nodes will be kept in buffer 260 at any one time.

During step 310, as items from the SBT 148 are merged with those from the LBT 132, the LBT's non-leaf pointers in buffer 260 are updated to reflect the merged data that will be stored at the location of PTR C in secondary memory.

At step 312, all full pages in Buffer C are copied into secondary memory at the end of the LBT file 132, noted by PTR D. Any indexed pointers remaining in Buffer C are moved to the beginning of that buffer. These pointers will be stored in the LBT 132 during the next merge operation, during which more pointers will be added to Buffer C. After the full pages of Buffer C are copied to secondary memory, PTR D is updated to point to the new end of the LBT file 132.

Note that if there is a system failure during the merge process, none of the data in secondary memory will be lost because the data between PTR A and PTR B is not released until the new merged data is safely stored in secondary memory.

At step 314 once every few passes through the merge operation, the modified non-leaf nodes in buffer 260 are copied to secondary memory and other non-leaf nodes needed for the next few merge operations are copied into buffer 260.

If all of the SBT 148 has not yet been merged into the LBT 132 (step 316), the next loop through the merge process restarts at step 306. The range of index values being merged is advanced during each pass through this loop until all of the SBT 148 has been merged into the LBT file 132. Then, at step 318, any remaining items from the LBT in buffers B and C are copied to disk at the end of the LBT file 132 (even if a page is only partially filled). Since everything in the SBT 148 has now been copied into the LBT file 132, all the entries in the SBT 148 are deleted. The disk space between PTR A and PTR B is released, and pointers PTR A and PTR C are reset to point to the beginning and tail of the LBT file 132.

During the process of merging the first SBT 148 into the LBT 132, many new indexed pointers will have been generated and stored in the second SBT 150. Once this merger process is completed, the entire process will restart at step 304 with the swapping of the definitions of the two SBT's.

In an alternate embodiment, instead of using two small B-trees 148 and 150, the system could use a single SBT by marking every indexed pointer with a special marker equal to either 0 or 1. During a first merger pass, indexed pointers marked with a 0 would be merged into the LBT 132, and all new indexed pointers stored in the SBT 148 would be marked with a 1. After the first merger is completed, items marked with a 1 would be merged into the LBT 132, and all new indexed pointers stored in the SBT 148 would be marked with a 0. During each subsequent merger, the roles of the pointers marked with 0's and 1's is swapped.

DELETING DATA FROM THE DATABASE

The preferred embodiment provides two mechanisms for deleting records from the database and index files 130, 132. First, the user may specify a specific record to be deleted. In this case, a "delete note entry" 270 is stored in the SBT at the position in the SBT 148 corresponding to the specified record's index value. The delete note entry looks exactly the same as an indexed pointer for a new record, except that a special delete bit flag in the item is set.

When the SBT leaf node containing a delete note entry is merged into the LBT 132, the delete note entry and the indexed pointer with the same index value "cancel each other out", and the matching indexed pointer is deleted (see step 308). The corresponding record is also deleted from the sequential data file 130. However, the deletion of the data record can be deferred as long as the delete filter specification is kept.

Second, the user (or an application program) may specify one or more filter ranges of items that are to be removed from the database. For instance, an application program may specify that all records with a transaction date more than 30 days old are to be deleted. The specified filter ranges are stored in delete filter list 272. Whenever records from the SBT and LBT are being merged, filter 274 compares each indexed pointer with the filter ranges in list 272 and deletes items that fall within any of the delete filter ranges. The corresponding records may also deleted be from the sequential data file 130 (see step 310).

RELATED MATTERS

Note that in FIG. 3, the rolling merge performed by the invention uses space at the end of the LBT file 132 and frees up space at its beginning. Eventually the end of the available disk storage will be reached, in which case the file wraps around to re-use discarded blocks of memory at the beginning of the disk's address space. As a result, the LBT file 132 will not be entirely contiguous. However, it should be noted that the file is actually never entirely logically contiguous because there is always a jump from the most recently stored merged pages to the next sequential index value. The use of "wrap around" addressing is well known to those skilled in the art of computer programming, and is usually considered to be "transparent" to users of the system. Thus, the LBT file 132 is still considered to be stored in indexed order, because the "next" logical address after the largest address is the lowest address.

The nodes in the memory resident SBT 148 can have nodes of any size. There is no need to insist on page size nodes since this tree never resides on disk. Therefore the nodes in the SBT are sized to maximize CPU efficiency, typically by minimizing depth of the tree (e.g., using a tree with only two or three levels).

Whenever any type of matching operation is performed on the database, typically to read a specified set of records, the system must perform a matching range search of both the SBT 148 (and SBT 150 if two SBT's are being used) and the LBT 132. This implies a slight CPU overhead over the normal B-tree case. Where unique index values are guaranteed by the manner in which they are generated, the indexed search is complete if it located the desired value in the SBT 148. In cases where the most frequent searches are to recently inserted records, this will mean that the memory resident B-tree SBT 148 fulfills a valuable buffering function.

Note that the multi-component B-tree of the present invention is not an appropriate data structure for maintaining a unique value constraint on index values, where an insert must be preceded by a search operation to assure that there is no duplication. Since the search operation is less efficient than the insert operation, such a requirement would vitiate much of the value of using the multi-component B-tree.

Any modifications that need to be made to records in the database which might modify key values can be handled by a delete operation followed by an insert.

The criteria at step 302 in FIG. 4 for making a pass through the merge procedure will typically be triggered, in practice, by monitoring the number of indexed pointer entries in the SBT 148, and triggering a merge whenever the number of indexed pointers in the SBT exceeds a specified number. This type of criteria minimizes disk access, and also paces the rate at which merges are performed so as to keep the SBT 148 close to a preselected optimum size (generally based on the amount of primary memory 108 which is available).

The large B-tree 132 stored in secondary memory is optimized for sequential disk access, with leaf nodes 100 percent full, and key-order sequences of nodes on each level of the tree packed together in continuous multi-page blocks for efficient disk arm use. Insertions of new indexed pointers into the large B-tree in secondary memory are performed very efficiently, with multi-page block writes in the megabyte range being typical.

Referring back to the banking system example discussed in the background of the invention, consider the disk usage rate required by the present invention to handle 100 indexed pointer inserts per second, with each indexed pointer needing twelve bytes of storage. 1200 bytes of new indexed pointer data are generated per second. We will assume that the system uses disks with a page size of 4096 bytes, and that merge operations typically increase the amount of data stored in any selected range of index values by one percent. This means that 99% of the data written to disk during each merge operation is old data. If a merge operation is performed once every two seconds, adding 2400 bytes of data to the large B-tree will require, on average, reading a block of 58 or 59 pages from disk, and then writing a block of 59 pages back to disk. However, each of the two blocks is stored in contiguous disk locations, meaning that each merge will require only two I/O operations (disk arm movements). Thus, in this example, inserting 100 new indexed pointers per second requires an average of only one disk I/O operation per second. When compared with the 200 disk I/O operations per second required using a standard, prior art B-tree, the advantages of the present invention are quite clear.

Since a disk storage device can typically handle up to 25 I/O operations per second, a single, very large disk storage device can used for storing the large B-tree, unlike the prior art system which required at least eight disk storage devices to keep up with the disk I/O operations. In both the prior art systems and in the present invention, the index file 132 will typically be stored on a different disk storage device from the disk or disks used to store the sequential data file 130, in part because of the large size of the database file, and in part to maximize the speed with which data can be inserted and retrieved from the database.

Using the present invention in the bank system example, new item insertion will occupy only about four percent of the single disk storage device's I/O capability, meaning that the disk device will still have a significant amount of I/O capability left over for search operations and the like. Furthermore, deletion of outdated database entries is automatically handled by the present invention without requiring any additional disk I/O operations, making the present invention even more efficient in its use of secondary memory resources when compared with the prior art standard B-tree approach.

ALTERNATE EMBODIMENTS

Figure 5:
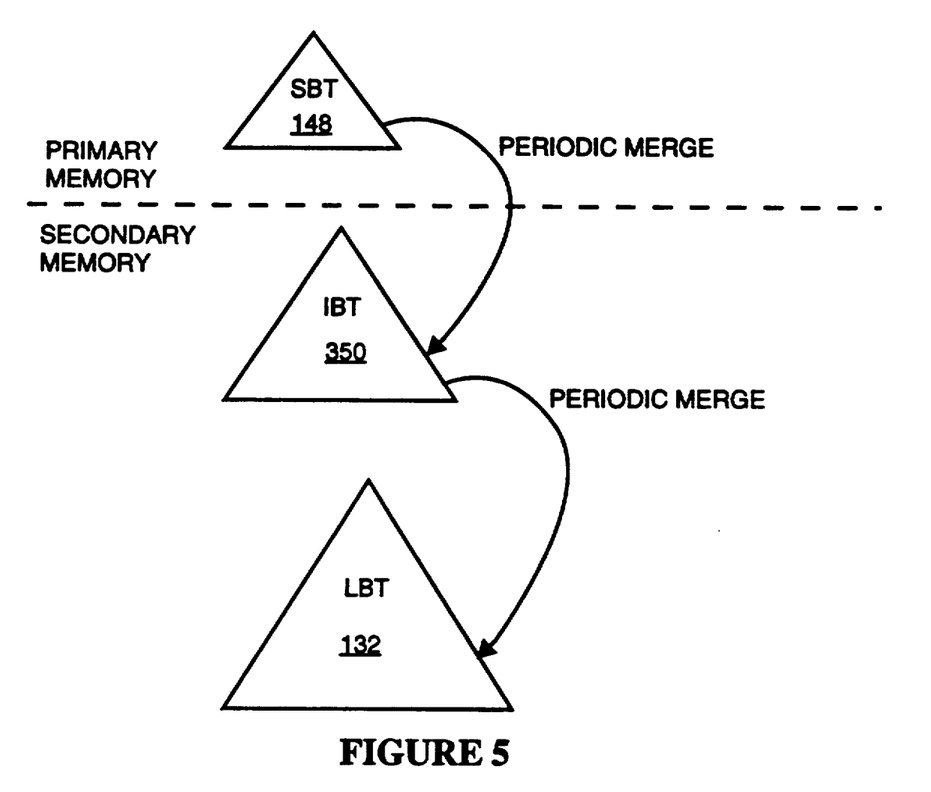
FIG. 5 is a conceptual block diagram for a three level version of the index buffering scheme of the present invention.

Referring to FIG. 5, it is possible to use more than two B-trees. For instance, an intermediate B-tree (IBT) 350, also stored on disk, could be inserted between the memory resident small B-tree SBT 148 and the large B-tree 132. Using this multilevel mechanism, data from the SBT 148 would be merged into the IBT 350 on a rolling basis, and data from the IBT 350 would be separately merged into the LBT 132 on a slower rolling basis. The advantage of a three level structure is that the rate at which the pages of the large B-tree need to be read and re-written to disk after merging with new records can be substantially decreased. This would probably only be justified for a high insertion rate database with well over a billion entries being retained in the database at any one time, in which case a very large number of pages would need to be read and re-written to disk for every page of new data to be inserted. A disadvantage of this multilevel structure would be that finding and reading items in the database would be made less efficient by the need to access three B-trees for many or most searches. For sufficiently large databases, four or more levels of B-trees could be used, with each level being merged on a continuing rolling basis into the B-tree at the next level down.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

In particular, the B-tree data structures used in the preferred embodiment could be replaced by other data structures, so long as the replacement data structures define a sorted order for referencing the records in the main data base. For instance, hash tables could be used in place of the B-trees of the preferred embodiment for storing indexed pointers. Entries in the hash tables would be stored in hash index order instead of indexed order. A small, memory resident, hash table would be merged periodically into a larger hash table stored in secondary memory, with the merge procedure proceeding in hash index order.

What is claimed is:

1. A method of storing and maintaining a database of entries in a computer system having primary random access memory and secondary memory, the steps of the method performed by said computer system comprising:

upon request, storing new records in a database file;

storing indexed pointers to said new records in a first tree data structure which is stored in primary memory;

storing a second tree data structure in secondary memory, said second tree data structure containing indexed pointers to all records in said database file other than records for which indexed pointers are stored in said first tree data structure; wherein said indexed pointers in said second tree data structure are stored in sequential order in said secondary memory;

periodically merging a portion of said first tree data structure into said second tree data structure by (1A) selecting a portion of the indexed pointers in said first tree data structure, (1B) retrieving from said secondary memory a corresponding portion of said indexed pointers in said second tree data structure, (1C) merging said selected portion of the indexed pointers in said first tree data structure into said indexed pointers retrieved from said second tree data structure to produce sequentially ordered merged indexed pointers, (1D) storing the merged index pointers in said secondary memory so as to maintain the stored index pointers in sequential order, and (1E) removing from said first tree data structure those indexed pointers which were merged with indexed pointers from said second tree data structure.

2. The method of claim 1, said periodically merging step including (1F) periodically changing said selected portion of the indexed pointers in said first tree data structure prior to performing steps (1A) through (1E) so that all indexed pointers stored in said first tree data structure are merged in said second tree data structure.

3. The method of claim 1, further including:

responding to each request to delete a specified record in said database file having a specified index value by (2A) searching said first tree data structure for an indexed pointer to said specified record, (2B) if said indexed pointer is found in said first tree data structure, deleting said specified record from said data file and deleting said indexed pointer from said first tree data structure, and (2C) otherwise storing in primary memory a delete note entry noting said specified index value;

said periodically merging step including:

(1G) while performing step (1C), deleting each retrieved indexed pointer in said second tree data structure having an index value which matches the index value specified by one of said delete note entries, and deleting the record in said database file corresponding to said deleted indexed pointer.

4. The method of claim 3, said step (2C) including storing in said first tree data structure, in accordance with said specified index value, a datum comprising said delete note entry; and said step (1G) including, when merging indexed pointers from said first tree data structure into said retrieved indexed pointers, deleting each retrieved indexed pointer having an index value which matches the index value specified by a delete note entry in said first tree data structure, and deleting the record in said database file corresponding to said deleted indexed pointer.

5. A method of storing and maintaining a database of entries in a computer system having primary random access memory and secondary memory, the steps of the method performed by said computer system comprising:

upon request, storing new records in a database file;

storing indexed pointers to said new records in a first tree data structure which is stored in primary memory;

storing a second tree data structure in secondary memory, said second tree data structure containing indexed pointers to all records in said database file other than records for which indexed pointers are stored in said first tree data structure; wherein said indexed pointers in said second tree data structure are stored in indexed order in said secondary memory;

periodically merging a portion of said first tree data structure into said second tree data structure by (1A) selecting a range of index values, (1B) retrieving from said secondary memory all indexed pointers in said second tree data structure in said selected range of index values, (1C) merging into said retrieved indexed pointers those indexed pointers in said first tree data structure matching said selected range of index values to produce merged indexed pointers in indexed order, (1D) storing said merged index pointers in said secondary memory so as to maintain the stored index pointers in indexed order, and (1E) removing from said first tree data structure those indexed pointers which were merged with indexed pointers from said second tree data structure.

6. The method of claim 5, said periodically merging step including (1F) periodically changing said selected range of index values prior to performing steps (1A) through (1E) so that all indexed pointers stored in said first tree data structure are merged into said second tree data structure.

7. The method of claim 5, further including:

responding to each request to delete a specified record in said database file having a specified index value by (2A) searching said first tree data structure for an indexed pointer to said specified record, (2B) if said indexed pointer is found in said first tree data structure, deleting said specified record from said data file and deleting said indexed pointer from said first tree data structure, and (2C) otherwise storing in primary memory a delete note entry noting said specified index value;

said periodically merging step including:

(1G) while performing step (1C), deleting each retrieved indexed pointer in said second tree data structure having an index value which matches the index value specified by one of said delete note entries, and deleting the record in said database file corresponding to said deleted indexed pointer.

8. The method of claim 7, said step (2C) including storing in said first tree data structure, in accordance with said specified index value, a datum comprising said delete note entry; and said step (1G) including, when merging indexed pointers from said first tree data structure into said retrieved indexed pointers, deleting each retrieved indexed pointer having an index value which matches the index value specified by a delete note entry in said first tree data structure, and deleting the record in said database file corresponding to said deleted indexed pointer.

9. A method of storing and maintaining a database of entries in a computer system having primary random access memory and secondary memory, the steps of the method performed by said computer system comprising:

storing a set of records in a database file in said secondary memory, each record in said file including a set of fields, wherein a specified set of said fields is designated to be said record's index value;

storing in primary random access memory a first tree data structure representing indexed pointers to a first subset of said records in said file; said first tree data structure including a multiplicity of leaf-nodes, each containing a multiplicity of indexed pointers to records in said file;

storing in secondary memory a second tree data structure representing indexed pointers a second subset of said records, said second subset of said records comprising those records in said file not included in said first subset of said records; said second tree data structure containing a multiplicity of leaf-nodes, said leaf-nodes in said second tree data structure containing indexed pointers with non-overlapping sets of index values, wherein said leaf-nodes are stored in said secondary memory in indexed order;

responding to requests to store new records by storing each new record in said file and storing an indexed pointer to said new record in said first tree data structure in primary random access memory in accordance with said record's index value; and periodically merging a portion of said first tree data structure into said second tree data structure by (1A) selecting a range of index values, (1B) retrieving from said second tree data structure in said secondary memory all indexed pointers in said selected range of index values, (1C) merging into said retrieved indexed pointers those indexed pointers in said first tree data structure matching said selected range of index values to produce merged indexed pointers in indexed order, (1D) storing said merged index pointers in said secondary memory in leaf-nodes in indexed order so as to maintain the index pointers stored in said secondary memory in indexed order, and (1E) removing from said first tree data structure those indexed pointers which were merged with indexed pointers from said second tree data structure.

10. The method of claim 9, said periodically merging step including (1F) periodically changing said selected range of index values prior to performing steps (1A)

through (1E) so that all indexed pointers stored in said first tree data structure are merged into said second tree data structure.

11. The method of claim 9, further including:

responding to each request to delete a specified record in said database file having a specified index value by (2A) searching said first tree data structure for an indexed pointer to said specified record, (2B) if said indexed pointer is found in said first tree data structure, deleting said specified record from said data file and deleting said indexed pointer from said first tree data structure, and (2C) otherwise storing in primary memory a delete note entry noting said specified index value;

said periodically merging step including:

(1G) while performing step (1C), deleting each retrieved indexed pointer in said second tree data structure having an index value which matches the index value specified by one of said delete note entries, and deleting the record in said database file corresponding to said deleted indexed pointer.

12. The method in claim 11, said step (2C) including storing in said first tree data structure, in accordance with said specified index value, a datum comprising said delete note entry; and said step (1G) including, when merging indexed pointers from said first tree data structure into said retrieved indexed pointers, deleting each retrieved indexed pointer having an index value which matches the index value specified by a delete note entry in said first tree data structure, and deleting the record in said database file corresponding to said deleted indexed pointer.

13. A database management system, having primary random access memory, secondary memory, and a central processing unit coupled to said primary memory and second secondary memory; the database management system comprising:

a database file, containing numerous records, which is at least partially stored in secondary memory;

an index for said records in said database file, said index comprising:

a first tree data structure which is stored in primary memory, said first tree data structure containing indexed pointers to a subset of the records in said database file; and a second tree data structure which is stored in secondary memory, said second tree data structure containing indexed pointers to all records in said database file other than records for which indexed pointers are stored in said first tree data structure; wherein said indexed pointers in said second tree data structure are stored in sequential order in secondary memory; and a database management program which is executed by said CPU; said database management program including:

new record storing means for storing new records in said database file and storing indexed pointers to said new records in said first tree data structure; and tree merge means, for periodically merging a portion of said first tree data structure into said second tree data structure by (1A) selecting a range of index values, (1B) retrieving from said secondary memory a corresponding portion of said indexed pointers in said second tree data structure, (1C) merging said selected portion of the indexed pointers in said first tree data structure into said indexed pointers retrieved from said second tree data structure to produce sequentially ordered merged indexed pointers, (1D) storing said merged index pointers in said secondary memory so as to maintain the stored index pointers in sequential order, and (1E) removing from said first tree data structure those indexed pointers which were merged with indexed pointers from said second tree data structure.

14. The database management system of claim 13, said tree merge means including means for periodically changing said selected portion of the indexed pointers in said first tree data structure prior to merging indexed pointers from said first tree data structure into said second tree data structure, so that all indexed pointers stored in said first tree data structure are merged into said second tree data structure.

15. The database management system of claim 13, said database management program further including:

delete means, responsive to requests to delete a specified record in said database file having a specified index value, which (2A) searches said first tree data structure for an indexed pointer to said specified record, (2B) if said indexed pointer is found in said first tree data structure, deletes said specified record from said data file and deletes said indexed pointer from said first tree data structure, and (2C) otherwise, stores in primary memory a delete note entry noting said specified index value;

said tree merge means including delete filter means which deletes each retrieved indexed pointer in said second tree data structure having an index value which matches the index value specified by one of said delete note entries, and which deletes the record in said database file corresponding to said deleted indexed pointer.

16. The database management system of claim 15, said delete means including means for storing in said first tree data structure, in accordance with said specified index value, a datum comprising said delete note entry; and said delete filter means including means for deleting each retrieved indexed pointer having an index value which matches the index value specified by a delete note entry in said first tree data structure, and for deleting the record in said database file corresponding to said deleted indexed pointer.

17. A database management system, having primary random access memory, secondary memory, and a central processing unit coupled to said primary memory and second secondary memory; the database management system comprising:

a database file, containing numerous records, which is at least partially stored in secondary memory;

an index for said records in said database file, said index comprising:

a first tree data structure which is stored in primary memory, said first tree data structure containing indexed pointers to a subset of the records in said database file; and a second tree data structure which is stored in secondary memory, said second tree data structure containing indexed pointers to all records in said database file other than records for which indexed pointers are stored in said first tree data structure; wherein said indexed pointers in said second tree data structure are stored in indexed order in secondary memory; and a database management program which is executed by said CPU; said database management program including:

new record storing means for storing new records in said database file and storing indexed pointers to said new records in said first tree data structure; and tree merge means, for periodically merging a portion of said first tree data structure into said second tree data structure by (1A) selecting a range of index values, (1B) retrieving from secondary memory all indexed pointers in said second tree data structure in said selected range of index values, (1C) merging into said retrieved indexed pointers those indexed pointers in said first tree data structure matching said selected range of index values to produce merged indexed pointers in indexed order, (1D) storing said merged index pointers in said secondary memory in indexed order so as to maintain the index pointers stored in said secondary memory in indexed order, and (1E) removing from said first tree data structure those indexed pointers which were merged with indexed pointers from said second tree data structure.

18. The database management system of claim 17, said tree merge means including means for periodically changing said selected range of index values prior to merging indexed pointers from said first tree data structure into said second tree data structure, so that all indexed pointers stored in said first tree data structure are merged into said second tree data structure.

19. The database management system of claim 17, said database management program further including:

delete means, responsive to requests to delete a specified record in said database file having a specified index value, which (2A) searches said first tree data structure for an indexed pointer to said specified record, (2B) if said indexed pointer is found in said first data structure, deletes said specified record from said data file and deletes said indexed pointer from said first tree data structure, and (2C) otherwise, stores in primary memory a delete note entry noting said specified index value;

said tree merge means including delete filter means which deletes each retrieved indexed pointer in said second tree data structure having an index value which matches the index value specified by one of said delete note entries, and which deletes the record in said database file corresponding to said deleted indexed pointer.

20. The database management system of claim 19, said delete means including means for storing in said first tree data structure, in accordance with said specified value, a datum comprising said delete note entry; and said delete filter means including means for deleting each retrieved indexed pointer having an index value which matches the index value specified by a delete note entry in said first tree data structure, and for deleting the record in said database file corresponding to said deleted indexed pointer.

21. A method of storing and maintaining a database of entries in a computer system having primary random access memory and second memory, the steps of the method performed by said computer system comprising:

upon request, storing new records in a database file;

storing indexed pointers to said new records in a first data structure which is stored in primary memory;

storing a second data structure in secondary memory, said second data structure containing indexed pointers to all records in said database file other than records for which indexed pointers are stored in said first data structure; wherein said indexed pointers in said second data structure are stored in sequential order in said secondary memory;

periodically merging a portion of said first data structure into said second data structure by (1A) selecting a portion of the indexed pointers in said first data structure, (1B) retrieving from said secondary memory a corresponding portion of said indexed pointers in said second data structure, (1C) merging said selected portion of the indexed pointers in said first data structure into said indexed pointers retrieved from said second data structure to produce sequentially ordered merged indexed pointers. (1D) storing the merged index pointers in said secondary memory so as to maintain the stored index pointers in sequential order, and (1E) removing from said first data structure those indexed pointers which were merged with indexed pointers from said second data structure.

22. A database management system, having primary random access memory, secondary memory, and a central processing unit coupled to said primary memory and second secondary memory; the database management system comprising:

a database file, containing numerous records, which is at least partially stored in secondary memory;

an index for said records in said database file, said index comprising:

a first data structure which is stored in primary memory, said first data structure containing indexed pointers to a subset of the records in said database file; and a second data structure which is stored in secondary memory, said second data structure containing indexed pointers to all records in said database file other than records for which indexed pointers are stored in said first data structure; wherein said indexed pointers in said second data structure are stored in sequential order in said secondary memory; and a database management program which is executed by said CPU; said database management program including:

new record storing means for storing new records in said database file and storing indexed pointers to said new records in said first data structure; and merge means, for periodically merging a portion of said first data structure into said second data structure by (1A) selecting a range of index values, (1B) retrieving from said secondary memory a corresponding portion of said indexed pointers in said second data structure, (1C) merging said selected portion of the indexed pointers in said first data structure into said indexed pointers retrieved from said second data structure to produce sequentially ordered merged indexed pointers, (1D) storing said merged index pointers in said secondary memory so as to maintain the stored index pointers in sequential order, and (1E) removing from said first data structure those indexed pointers which were merged with indexed pointers from said second data structure.

* * * * *